United States Patent
Sridharan et al.

(10) Patent No.: US 12,525,835 B2
(45) Date of Patent: Jan. 13, 2026

(54) ROTOR ASSEMBLY FOR AN ELECTRICAL MACHINE

(71) Applicant: GE AVIATION SYSTEMS LLC, Grand Rapids, MI (US)

(72) Inventors: Balamurugan Sridharan, Bengaluru (IN); Hari Meka, Bengaluru (IN); Mamatha Ramakrishnaiah, Bengaluru (IN)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 383 days.

(21) Appl. No.: 18/184,764

(22) Filed: Mar. 16, 2023

(65) Prior Publication Data
US 2023/0396107 A1    Dec. 7, 2023

(30) Foreign Application Priority Data
Jun. 3, 2022   (IN) .............................. 202211031899

(51) Int. Cl.
| | |
|---|---|
| *H02K 1/32* | (2006.01) |
| *F01D 5/02* | (2006.01) |
| *H02K 7/18* | (2006.01) |
| *H02K 9/19* | (2006.01) |
| *H02K 11/04* | (2016.01) |

(52) U.S. Cl.
CPC ................. *H02K 1/32* (2013.01); *F01D 5/02* (2013.01); *H02K 7/1823* (2013.01); *H02K 9/19* (2013.01); *H02K 11/04* (2013.01); *F05D 2220/32* (2013.01)

(58) Field of Classification Search
CPC .......... H02K 1/32; H02K 7/1823; H02K 9/19; H02K 11/04; F01D 5/02; F05D 2220/32
USPC .......................................................... 310/54
See application file for complete search history.

(56) References Cited

U.S. PATENT DOCUMENTS

| | | | |
|---|---|---|---|
| 2,894,155 | A | 7/1959 | Labstie |
| 5,237,227 | A | 8/1993 | Huss |
| 5,589,720 | A * | 12/1996 | Berger .................. H02K 9/197 310/61 |
| 6,903,470 | B2 | 6/2005 | Doherty et al. |
| 7,687,928 | B2 | 3/2010 | Taneja et al. |
| 8,525,375 | B2 | 9/2013 | Pal |
| 9,257,883 | B2 * | 2/2016 | Büttner .................. H02K 9/16 |
| 9,260,007 | B2 | 2/2016 | Sakaguchi |
| 9,837,868 | B2 | 12/2017 | Wirsch, Jr. et al. |
| 10,135,319 | B2 | 11/2018 | Hanumalagutti et al. |
| 10,461,595 | B2 | 10/2019 | Teter et al. |

(Continued)

FOREIGN PATENT DOCUMENTS

| | | |
|---|---|---|
| CN | 110022034 B | 5/2020 |
| DE | 102020207431 A1 * | 12/2021 |

(Continued)

*Primary Examiner* — Ahmed Elnakib
(74) *Attorney, Agent, or Firm* — Thomas | Horstemeyer, LLP

(57) ABSTRACT

A rotor assembly for an electric machine includes a first end and a second end, the second end distal from the first end in an axial direction, a first radial wall extending between the first end and the second end and defining an inner cavity, and a second radial wall extending between the first end and the second end, the second radial wall radially-overlying the first radial wall and defining an outer cavity between the first radial wall and the second radial wall.

17 Claims, 10 Drawing Sheets

(56) References Cited

U.S. PATENT DOCUMENTS

| | | |
|---|---|---|
| 10,554,088 B2 | 2/2020 | Huang et al. |
| 11,025,114 B2 | 6/2021 | Sridharan et al. |
| 11,038,394 B2 | 6/2021 | Chhabra et al. |
| 11,146,133 B2 | 10/2021 | Piazza Galarza et al. |
| 2008/0272661 A1* | 11/2008 | Zhou ...................... H02K 9/197 |
| | | 310/61 |
| 2016/0164378 A1 | 6/2016 | Gauthier et al. |
| 2018/0026504 A1 | 1/2018 | Huang et al. |
| 2018/0269743 A1* | 9/2018 | Büttner ................ F16J 15/3404 |
| 2018/0323682 A1* | 11/2018 | Sime ........................ B60K 1/00 |
| 2021/0281134 A1* | 9/2021 | Lux .......................... H02K 1/32 |
| 2021/0376685 A1* | 12/2021 | Hacklberger .......... H02K 5/203 |
| 2023/0396107 A1* | 12/2023 | Sridharan ................ H02K 9/19 |

FOREIGN PATENT DOCUMENTS

| | | | | |
|---|---|---|---|---|
| DE | 102020121724 A1 * | 2/2022 | | |
| EP | 2487060 B1 | 4/2017 | | |
| EP | 2276151 B1 | 7/2020 | | |
| EP | 3965266 A1 * | 3/2022 | .......... | H02K 1/2706 |
| JP | 2003219607 A | 7/2003 | | |
| JP | 2020162198 A | 10/2020 | | |

* cited by examiner

ROTOR ASSEMBLY FOR AN ELECTRICAL MACHINE

CROSS REFERENCE TO RELATED APPLICATION(S)

This application claims priority to and benefit of India Patent Application No. 202211031899, filed Jun. 3, 2022, which is incorporated herein in its entirety.

TECHNICAL FIELD

The disclosure relates to a rotor in an electric machine and more specifically for cooling fluid in a rotor of an electric machine.

BACKGROUND

Contemporary aircraft engines include electric machine assemblies, or generator systems, which utilize a running aircraft engine in a generator mode to provide electrical energy to power systems and components on the aircraft. Some aircraft engines can further include starter/generator (S/G) systems or motor/generator (M/G), which act as a motor to start an aircraft engine from its high pressure spool or a motor to drive the engine from its low pressure spool, and as a generator to provide electrical energy to power systems on the aircraft after the engine is running.

Motors and generators can be wet cavity systems, wherein a cavity housing the rotor and stator is exposed to liquid coolant, or dry cavity systems, wherein the cavity is not exposed to liquid coolant. Dry cavity cooling can also utilize liquid coolant in one or more contained cooling systems, but they are still considered dry cavity so long as the cavity is not exposed to liquid coolant. In general, dry cavity systems generally have less losses, higher efficiency, higher reliability, less required maintenance, and attitude independence over wet cavity systems. In contrast, the power density of a wet cavity electric machine can be higher than that of a dry cavity electric machine due to its higher cooling effectiveness. However, this may not be true once more than one contained cooling system is applied in a dry cavity machine.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Figure 1:
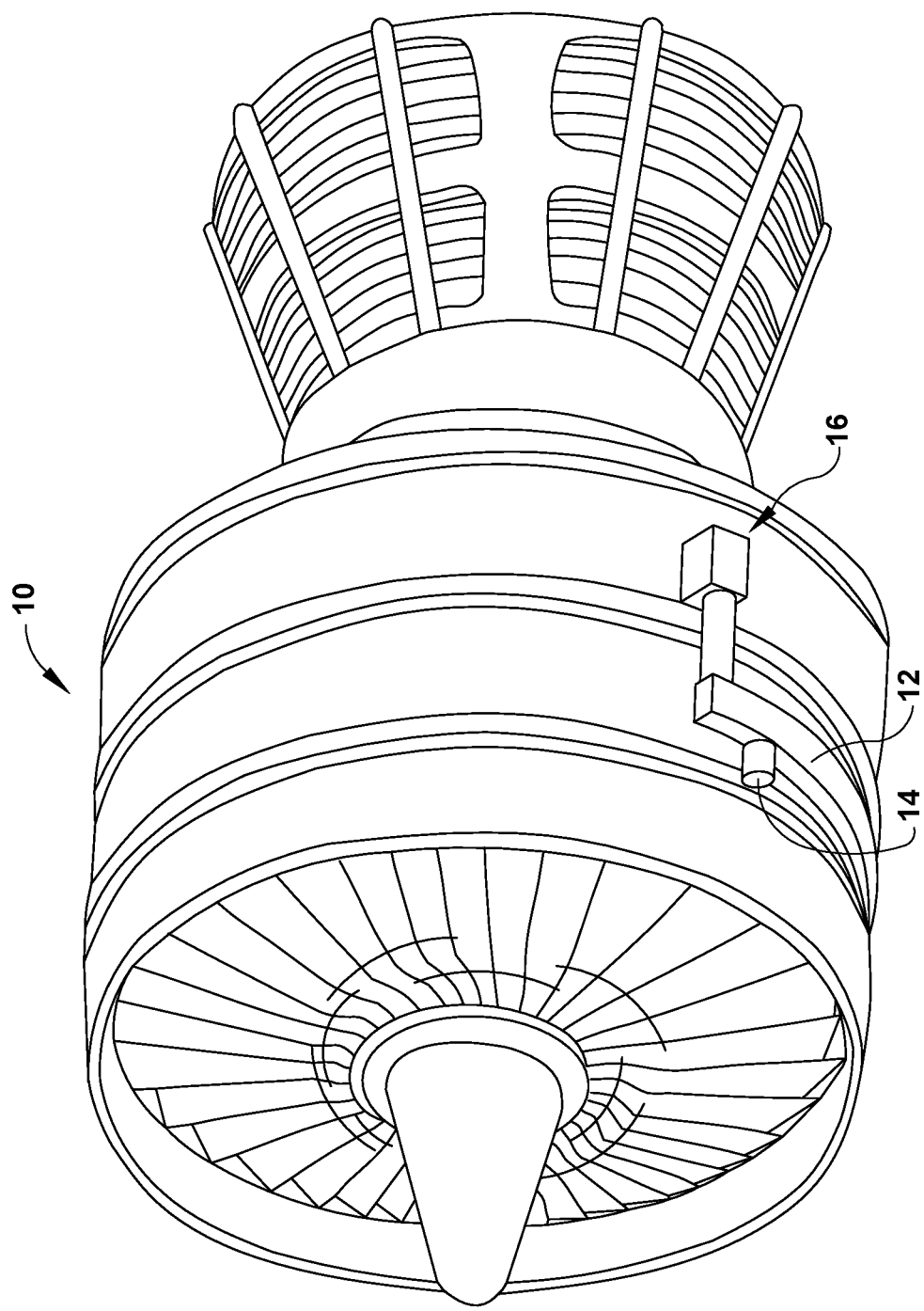
FIG. 1 is a perspective view of a gas turbine engine having a generator in accordance with various aspects described herein.

Aspects of the disclosure can be implemented in any environment using an electric generator or motor regardless of whether the electric generator or motor provides a driving force or generates electricity. For purposes of this description, such an electric motor will be generally referred to as an electric machine, electric machine assembly, generator, or similar language, which is meant to clarify that one or more stator/rotor combinations can be included in the machine.

As used herein, the term "set" or a "set" of elements can be any number of elements, including only one. As used herein, the terms "axial" or "axially" refer to a dimension along a longitudinal axis of an electric machine or rotor, or along a longitudinal axis of a component disposed within the electrical machine or rotor.

Additionally, as used herein, the terms "radial" or "radially" refer to a direction away from a common center, such as the longitudinal axis. For example, in the overall context of an electric machine, radial refers to a direction along a ray extending between a center longitudinal axis of the electric machine and an outer electric machine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

The disclosure can be implemented in any electrical machine environment having a rotor. A non-limiting example of an electrical machine environment that can include aspects of the disclosure can include an aircraft power system architecture, which enables production of electrical power from at least one spool of a turbine engine, preferably a gas turbine engine, and delivers the electrical power to a set of electrical loads.

While this description is primarily directed toward an electric machine providing power generation, it is also applicable to an electric machine providing a driving force or an electric machine providing both a driving force and power generation. Additional power generating devices, starter/generator configurations, or electric motor configurations are equally applicable to aspects of the disclosure. Further, while this description is primarily directed toward an aircraft environment, aspects of the disclosure are applicable in any environment using an electric machine. Thus, a brief summary of a contemplated environment should aid in a more complete understanding.

Cooling design for an electric machine assembly, especially for a variable frequency electrical machine or generator, can be complex due to the range of rotational speed experienced by a rotor of the electric machine. In one non-limiting example, the ratio of speed at a max operating rotational speed of the rotor can be as high as 2.2 times the idle operating speed of the electric machine. Effective cooling of the electric machine and components thereof driven by the configuration and implementation of the coolant flow and cooling systems, and designed to manage or maintain appropriate coolant pressure, pressure flow, coolant flow velocity, pressure drop, leakage flow, and flow variation, between the range of rotational speeds in a variable frequency electric machine. Thus, an operable cooling system for an electric machine can be utilized where at least a subset of the coolant flow and cooling system design and management can be based around the rotational speed of the rotor of the electric machine to ensure at least a subset of the aforementioned considerations.

FIG. 1 illustrates a gas turbine engine 10 having an accessory gear box (AGB) 12 and a generator 14 according to an aspect of the disclosure. The gas turbine engine 10 can be a turbofan engine, such as a General Electric GEnx or CF6 series engine, commonly used in modern aviation or it could be a variety of other known gas turbine engines such as a turboprop or turboshaft. The AGB 12 can be coupled to a turbine shaft (not shown) of the gas turbine engine 10 by way of a mechanical power take off 16. The type and specifics of the gas turbine engine 10 are not germane to the disclosure and will not be described further herein. While a generator 14 is shown and described, aspects of the disclosure can include any electrical machine, generator, motor, starter/generator, of combination there, and are not limited to generator aspects that can provide electrical power. For instance, in one non-limiting example, a generator can operate in a power generation mode to provide power, or in a motor mode, wherein power is consumed to generate rotational force, such as propulsion. Non-limiting examples of the generator 14 can include synchronous or asynchronous machine architectures.

Figure 2:
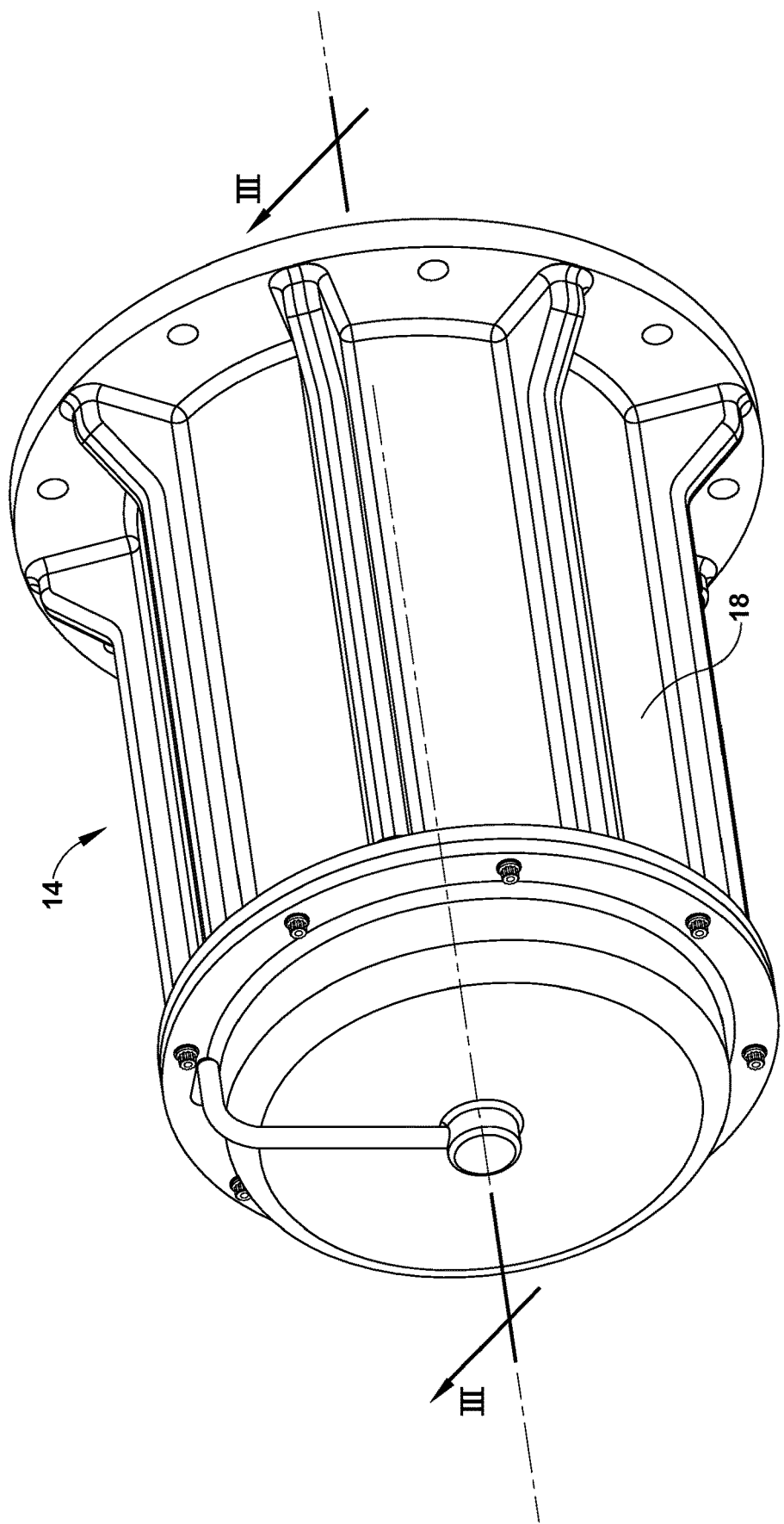
FIG. 2 is a perspective view of an exterior of the generator of FIG. 1, in accordance with various aspects described herein.

FIG. 2 more clearly illustrates the generator 14 and its housing 18. Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors.

Non-limiting aspects of the disclosure can be included wherein, for instance, a clamping interface can be included and used to clamp the generator 14 to the AGB 12. In another non-limiting aspect of the disclosure, the generator 14 can include a liquid coolant system for cooling or dissipating heat generated by components of the generator 14 or by components proximate to the generator 14, such as the gas turbine engine 10. For example, the generator 14 can include a liquid cooling system using oil as a coolant. The liquid cooling system can include a cooling fluid inlet port and a cooling fluid outlet port (not shown) for controlling the supply of coolant to the generator 14. In yet another non-limiting aspect of the disclosure, the generator 14 can further include other liquid cooling system components, such as a liquid coolant reservoir fluidly coupled with the cooling fluid inlet port or cooling fluid outlet port, or a liquid coolant pump to forcibly supply the coolant through the ports or generator 14. Oil is merely one non-limiting example of a liquid coolant that can be used in aspects of the disclosure. Additional or alternative types of fluid coolant can be included in aspects of the disclosure, including but not limited to, liquids, gases, fluids, or a combination thereof.

Figure 3:
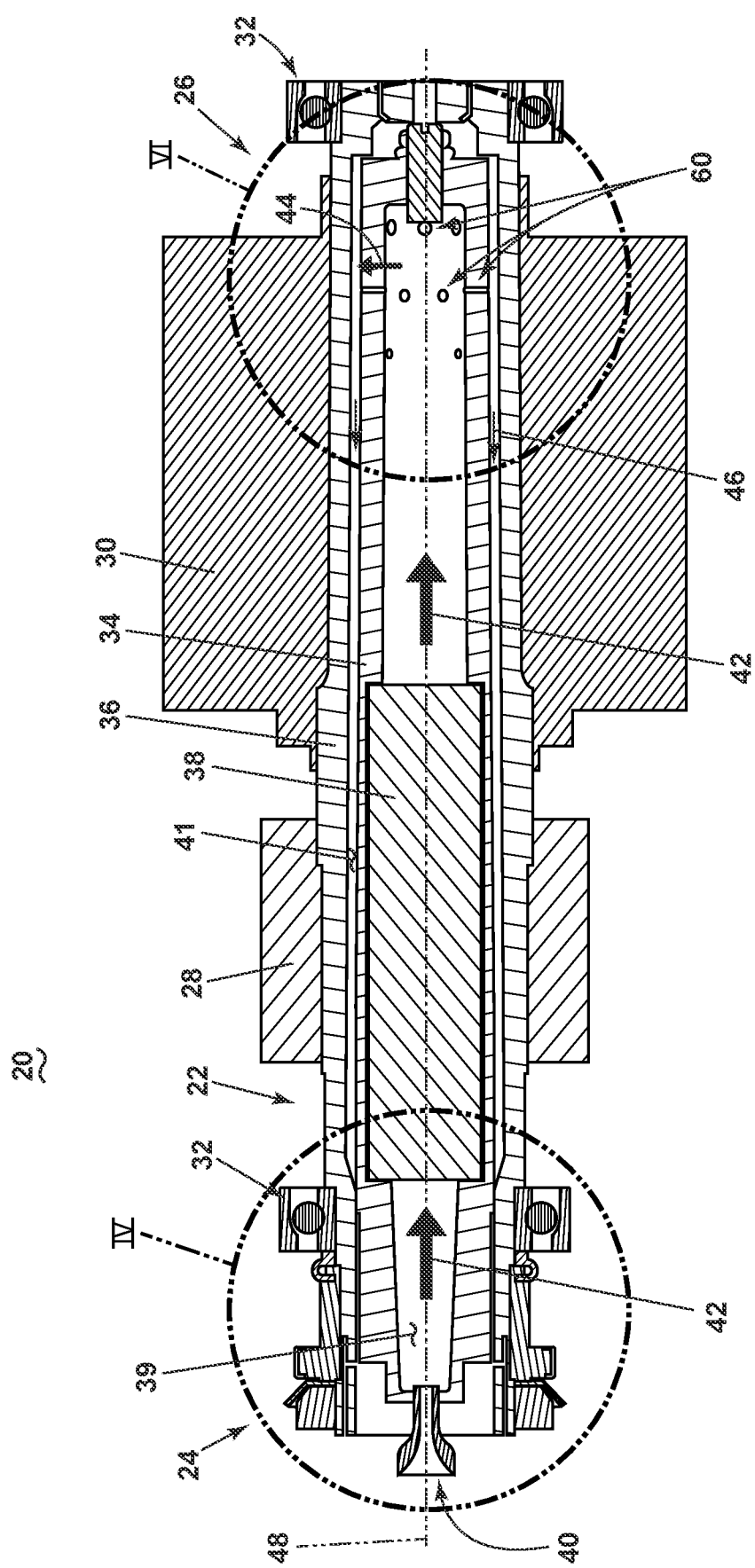
FIG. 3 is a schematic cross-sectional view of a rotor of the generator, taken along line III-III of FIG. 2, in accordance with various aspects described herein.

One non-limiting example rotor assembly 20 for the generator 14 is best seen in FIG. 3, which is a cross-sectional view of the rotor assembly 20. The rotor assembly 20 includes a rotatable shaft 22 located within the generator (not shown, for brevity) and is the primary structure for supporting a variety of rotatable components. The rotatable shaft 22 can have a single diameter or one that can vary along its length. The rotatable shaft 22 is supported by spaced bearings 32 and configured to rotate about an axis of rotation 48. Several of the elements of the generator have a fixed component and a rotating component, with the rotating component being provided on the rotatable shaft 22. Examples of these rotatable elements can include a main machine rotor 30, an exciter rotor 28, or the like, and are shown in schematic cross section, for understanding. Additional rotor assembly 20 or rotational components can be included, including, but not limited to, a permanent magnet generator (PMG), or the like, and are not shown or described for brevity. Also, as shown, the exciter rotor 28 and the main machine rotor 30 can be disposed along an outer radius of the rotatable shaft 22, and at different axially-spaced positions along the axis of rotation 48.

The rotatable shaft 22 can include a first end 24 and a second end 26, where the second end 26 is axially-spaced from the first end 24. Non-limiting aspects of the disclosure can be included where the rotatable shaft 22 can include a first or inner wall 34, such as an inner radial wall, defining an inner cavity 39, a first interior, or a cavity, and a second or outer wall 36, such as an outer radial wall, defining an outer cavity 41, a second interior, or a cavity. The inner wall 34 can include a circumferential wall, including, but not limited to, a generally cylindrical body that extends between at least a portion of the first end 24 to the second end 26. The outer wall 36 can also include a circumferential wall, including, but not limited to, a generally cylindrical body that extends between at least a portion of the first end 24 to the second end 26. In one non-limiting aspect of the disclosure, the inner wall 34 and outer wall 36 can be rotationally coupled to co-rotate with the rotor assembly 20. In another non-limiting aspect of the disclosure, the inner wall 34 and the outer wall 36 can be fixedly coupled with each other. In one non-limiting example, the inner wall 34 can include a rectifier sleeve. In another non-limiting example, the outer wall 36 can include a rotor shaft.

Non-limiting aspects of the disclosure can also be included wherein the outer wall 36 is coaxial with the inner wall 34 and wherein the outer wall 36 encompasses, envelopes, other otherwise radially-overlies the inner wall 34. In this sense, the outer cavity 41 can be defined by a space radially bound by an outer surface of the inner wall 34 and an inner surface of the outer wall 36. As shown, a set of apertures, openings 60, or the like, can be defined in the inner wall 34 proximate to or near the second end 26 of the rotatable shaft 22, and allow a fluid coupling between the inner cavity 39 and the outer cavity 41. In another non-limiting aspect, each of the inner cavity 39 and the outer cavity 41 can define a generally annular space, as explained herein. Non-limiting aspects of the set of openings 60 are better viewable with respect to FIG. 6. Additionally, while not shown, additional apertures, openings, fluid connections, or the like, can fluidly couple the inner cavity 39 with the outer cavity 41. For example, openings can be located at an axial end of the inner wall 34. Additionally, any number of openings, including additional or fewer openings than shown, can be included, and can include any combination of geometric aperture shape or shaping.

While "circumferential wall" and "generally cylindrical body" are used herein, aspects of the disclosure can be included wherein the inner wall 34, the outer wall 36, or both the inner wall 34 and the outer wall 36 are not strictly at the same circumference, circumferential dimensions, radii at inner or outer surfaces of the walls 34, 36, or the like, along the axial direction between the first and second ends 24, 26. Similarly, a "generally cylindrical body" can include aspects of the disclosure wherein a strict cylindrical shape, radii, circumference, or the like is either implied or defined along the axial direction between the first and second ends 24, 26.

Non-limiting aspects of the disclosure can be included wherein the inner wall 34, the outer wall 36, or both the inner wall 34 and the outer wall 36 have, define, or otherwise include radial divergences along the axial direction between the first and second ends 24, 26. The radial divergences described herein can include gradual radial divergences, such as an increasing or decreasing radial dimension along the axis of rotation 48 (including both increasing and decreasing radial dimensions at different respective axial portions), abrupt changes to radial dimensions (e.g. stepping segments from a first radius to a second radius), or a combination thereof. In another non-limiting aspect of the disclosure, the described radial divergences can occur at or along an inner surface of one or more respective wall 34, 36, at or along an outer surface of one or more respective wall 34, 36, or at or along both an inner surface and outer surface of one or more respective walls 34, 36.

FIG. 3 includes a schematic outline of an optional rotating rectifier assembly 38 for understanding. While shown as a solid cross-section, aspects of the disclosure can be understood where the optional rotating rectifier assembly 38 is not strictly a solid component, and allows for or enables a fluid coupling, connection, or flow between the inner cavity 39 proximate to the first end 24 of the rotatable shaft 22 and the inner cavity 39 proximate to the second end 26 of the rotatable shaft 22.

During operation of the rotor assembly 20 or generator, relative rotation of the rotor assembly 20 with generator components can generate heat in a set or subset of rotor assembly 20 components. For example, in non-limiting aspects of the disclosure, the main machine rotor 30 can include main machine rotor windings (not specifically shown), whereby current conducted in the rotor windings generates heat in the windings, during operation of the electrical machine. In yet another non-limiting example, operation of the generator can generate heat in the optional rotating rectifier assembly 38. Thus, non-limiting aspects of the disclosure can be included wherein cooling fluid, such as coolant, can be provided to the electrical machine, the rotor assembly 20, or the like, to remove heat due to the generated heat. In one non-limiting example, a coolant, or coolant source, can include an oil coolant.

In one non-limiting example, the first end 24 of the rotor assembly 20 can include or define a coolant inlet 40 configured or adapted for receiving a fluid coolant. In this sense the coolant inlet 40 can receive a first coolant flow (shown schematically as a flow arrow 42) from a pressurized coolant source (not shown). As shown, the first coolant flow 42 can be received at the coolant inlet 40, and can further be provided to the inner cavity 39. From there, coolant flow 42 can flow from the first end 24 of the rotatable shaft 22 toward the second end 26 of the rotatable shaft 22, along an axial direction. In one non-limiting example, the coolant flow 42 can pass over, through, or about an optional rotating rectifier assembly 38, cooling the assembly 38 or components thereof.

At the second end 26 of the rotor assembly 20, the coolant flow 42 moves radially outward from the inner cavity 39 to the outer cavity 41, through the set of openings 60 (radially outward flow shown by arrows 44). While within the outer cavity 41, the pressurized flow of additional coolant at the coolant inlet 40 enables the coolant to flow generally from the second end 26 toward the first end 24, as shown by coolant flow arrow 46. In this sense, the coolant flow 46 within the outer cavity 41 is generally opposite to the axial direction of coolant flow 42 within the inner cavity 39.

Figure 4:
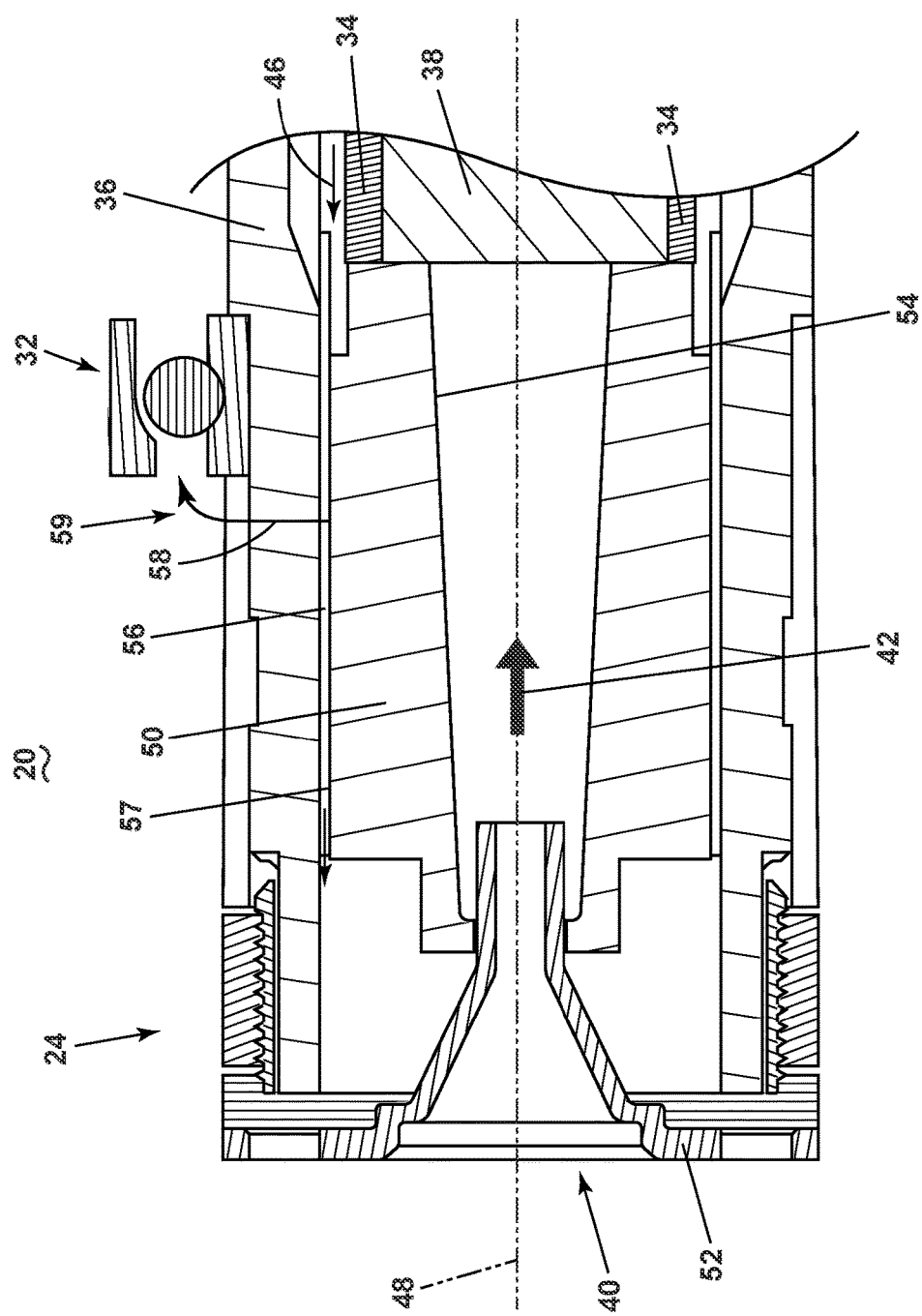
FIG. 4 is a schematic zoomed cross-sectional view of a first end of the rotor of FIG. 3, in accordance with various aspects described herein.

Turning now to FIG. 4, a zoomed view of the first end 24 of the rotor assembly 20 is shown, for understanding. As shown, the first end 24 of the rotor assembly can further include a cap 50 which, for example, can be axially positioned relative to the inner wall 34, and, for example, can be coaxially received within the outer wall 36. The cap can define an inner surface 54 that fluidly defines at least a portion of, or is fluidly connected with, the inner cavity 39. In another non-limiting example, the cap 50 can include an outer surface 57 defining a passage, a channel 56, or the like, to allow or otherwise enable at least a portion of the coolant flow 46 to flow outside of, and past the cap 50, toward the first end 24. In this sense, the channel 56 can be bound by the outer surface of the cap 50, and an inner surface of the outer wall 36. While not shown, the first end 24 can include a configuration or adaptation to operably allow removal of coolant that flows past the cap 50, as described herein. For example, aspects of the disclosure can allow for or enable scavenging coolant collected or removed from the first end 24.

Non-limiting aspects of the cap 50 can be included where the inner surface 54 defines an angled surface relative to the axis of rotation 48. For example, in the non-limiting example shown, the inner surface 54 can include an increasing radius along the direction of coolant flow 42, that is, in the direction of the first end 24 toward the second end 26. Additional or alternative angled surfaces can be included.

The first end 24 of the rotor assembly 20 is also shown including optional outlets 58 that can define or allow for optional coolant flow 59, as desired. For example, in one non-limiting example, a set of optional outlets 58 can be included and axially positioned to enable or otherwise allow for at least a portion of coolant flow 46 to be provided, by way of optional coolant flow 59, to bearings 32, for cooling or lubrication. The cap 50 can further be coupled with a nozzle 52, which can at least partially define the coolant inlet 40.

During rotation of the rotor assembly 20, coolant received at the coolant inlet 40 can be fluidly provided within and through the cap 50. Due to the rotation of the rotor assembly 20, centrifugal forces acting on the coolant can direct the coolant along the inner surface 54 of the cap, which can be further guided in the direction of the coolant flow 42 from the first end 24 toward the second end 26. In this sense, the inner surface 54 can be determined, configured, adapted, formed, or the like, the enable a directing of the coolant flow 42 from the first end 24 toward the second end 26, including at least partially pressurizing the coolant in the direction of the coolant flow 42. In this sense, the inner surface 54 can be configured, shaped, angled, or adapted to increase or decrease the coolant flow 42, the coolant flow 42 velocity, or the like. In another non-limiting example aspect of the disclosure, the rotation of the rotor assembly 20, in combination with aspects described herein, including but not limited to the cap 50 or the angled inner surface 54, can be configured, adapted, or designed to operate such that the speed of rotor assembly 20 rotation can operably affect the coolant flow 42 velocity. For example, increasing rotational speed of the rotor assembly 20 can resulting or operably affect the movement of coolant along the inner surface 54 of the cap by way of the centrifugal forces acting on the coolant, and resultingly or operably increase the coolant flow 42 velocity. While "coolant flow velocity" is described with reference to arrow 42, it is understood that any downstream coolant flow 42, 44, 46, or the like can likewise result in an increased coolant flow velocity.

Figure 5:
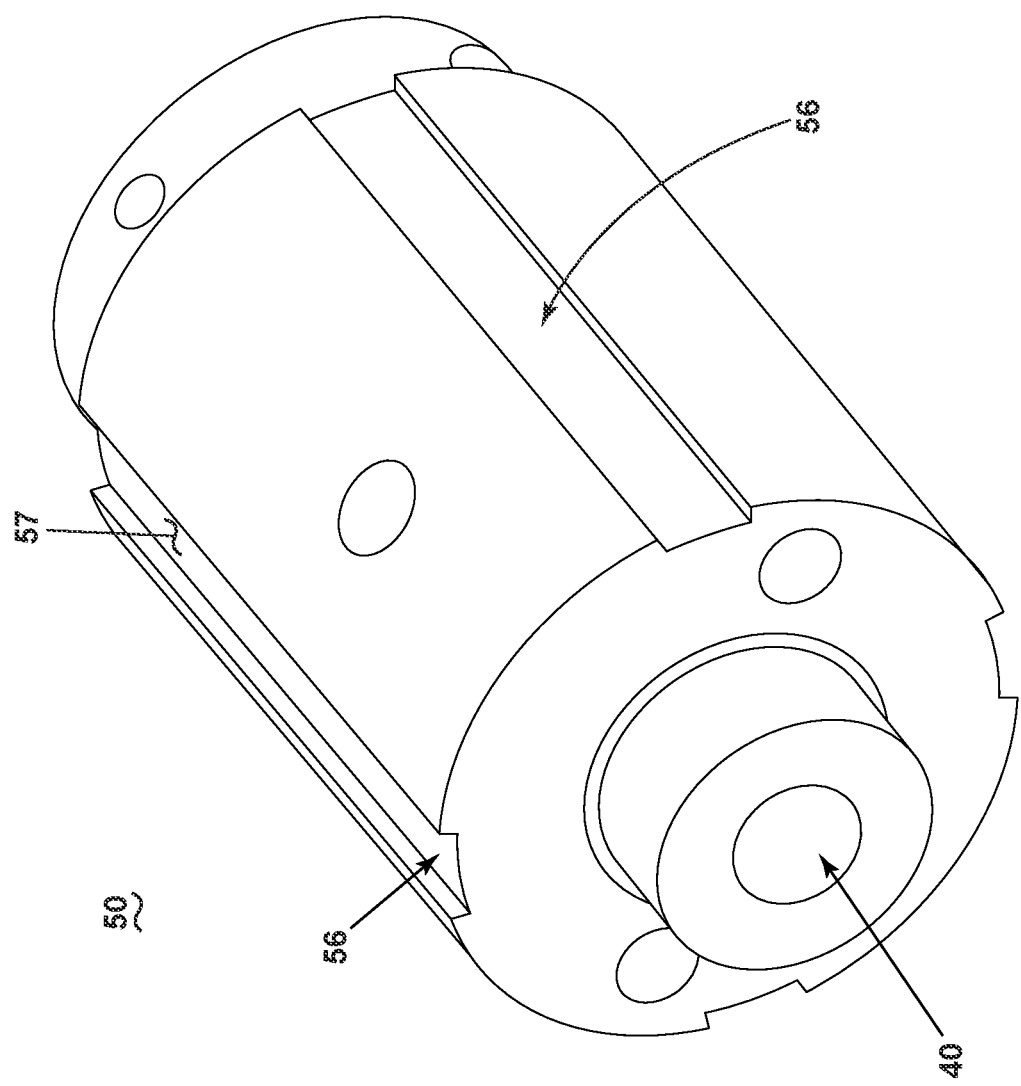
FIG. 5 is a perspective view of a rotor cap of the rotor of FIG. 3, in accordance with various aspects described herein.

FIG. 5 illustrates a perspective view of the cap 50 for understanding. As shown, the cap 50 includes an outer surface 57 defining a set of channels 56 described herein. Aspects of the set of channels 56, including sizes, number of channels 56, and orientations of one or more channels 56 about the periphery of the cap 50 can be selected or arranged based on a desired coolant flow pressure or coolant flow velocity desired, as the cap 50 and set of channels 56 is generally the last coolant flow path portion prior to coolant exiting the rotor assembly. Thus, reducing the coolant flow or coolant flow velocity exiting the rotor assembly can operably be designed or determined to affect or define at least a portion of the coolant flow or coolant flow velocity of the rotor assembly. In another non-limiting example, selected or arranged aspects of the set of channels 56 can provide sufficient escape or exit of the coolant such that the rotor assembly 20 does not experience unnecessary or undesirable rotational drag from too much coolant, excessive coolant pressure, or the like.

Figure 6:
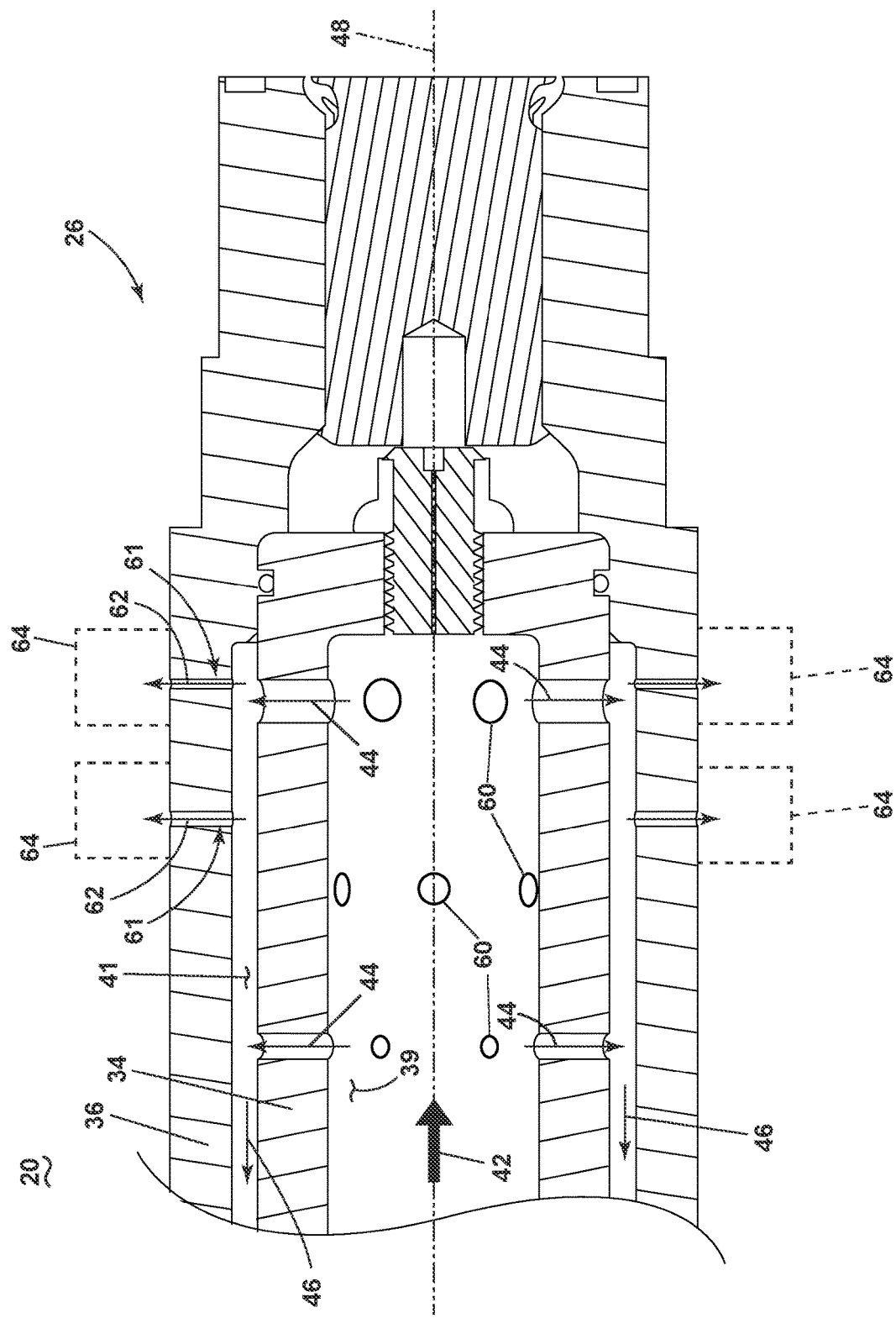
FIG. 6 is a schematic zoomed cross-sectional view of a second end of the rotor of FIG. 3, in accordance with various aspects described herein.

FIG. 6 illustrates a zoomed cross-sectional view of the second end 26 of the rotor assembly 20. As shown, the set of openings 60 can include multiple rows, multiple columns, or multiple arrangements of openings 60 axially spaced from each other, circumferentially spaced from each other, or both axially spaced and circumferentially spaced from each other. Additionally, different rows or columns of the set of openings 60 can be circumferentially offset from each other. Additionally, as shown, different openings 60 can have different sizes, such as aperture size, radial size, shapes, configurations, number or placement of openings 60 in a single row or column (for example, compared with another row or column) or the like. In one non-limiting example, the different sizes of the set of openings 60 can be configured or adapted to operably design or control coolant flow or coolant flow velocity between the inner cavity 39 and the outer cavity 41. For example, additional openings 60, fewer openings 60, larger openings 60, smaller openings 60, or a combination thereof, can operably control coolant flow 44 or coolant flow 44 velocity through the openings, or between the inner cavity 39 and the outer cavity 41.

In yet another non-limiting example, variations between groupings of the set of openings 60 can be included. For example, in the illustration of FIG. 6, a subset of the openings 60 closest to the first end 24 (e.g. axially farthest from the second end 26) can define a smaller opening 60 radius or aperture relative to a different subset of openings 60 closer or closest to the second end 26. In yet another non-limiting example, sets or subsets of openings 60 axially spaced from each other can include increasingly larger openings 60, radii, apertures, or the like. In yet another non-limiting example, axial spacing between openings 60, circumferential spacing between openings 60, or a combination of both axial and circumferential spacings between openings 60 can vary between openings, including increasing or decreasing spacings. In another non-limiting example, the operably control of the coolant flow 44 or coolant flow 44 velocity through the openings 60 (including sizing, shaping, positioning, a combination thereof, or the like, as described herein) can be tailored based on a particular rotational speed or rotational speed range of the rotor assembly 20.

Also shown in FIG. 6, additional openings 61 can be optionally included in the outer wall 36 to allow for or enable a coolant flow 62 external to the outer wall 36. In one non-limiting example, the coolant flow 62 can include at least a portion of the coolant flowing from inner cavity 39 to the outer cavity 41, and can include a portion of the coolant flow 46 diverted from the outer cavity 41 to another component 64, generically shown in dotted outline.

Non-limiting examples of another component 64 receiving the coolant flow 62 can include, but are not limited to, a nozzle for spraying coolant on one or more components (e.g. in a wet cavity electrical machine), additional cooling passages for cooling one or more additional components (e.g. a closed loop cooling system, such as for a dry cavity electrical machine, or for cooling windings or aspects of the main machine rotor 30, exciter rotor 28, a PMG, or windings thereof), providing a coolant flow for any further components having a need for coolant or lubrication (e.g. such as the bearings 32). Additional examples can be included. Additionally, while two additional components 64 are shown, any number of additional components, fluidly connected by way of respective additional openings 61, coolant flows 62, or the like, can be included and spaced along the axial length of the rotor assembly 20.

Additionally, while not illustrated, aspects of the disclosure can be included wherein a coolant flow can further be included to provide, deliver, or otherwise supply coolant to the spline, or aspects thereof, of the rotor assembly 20.

Figure 7:
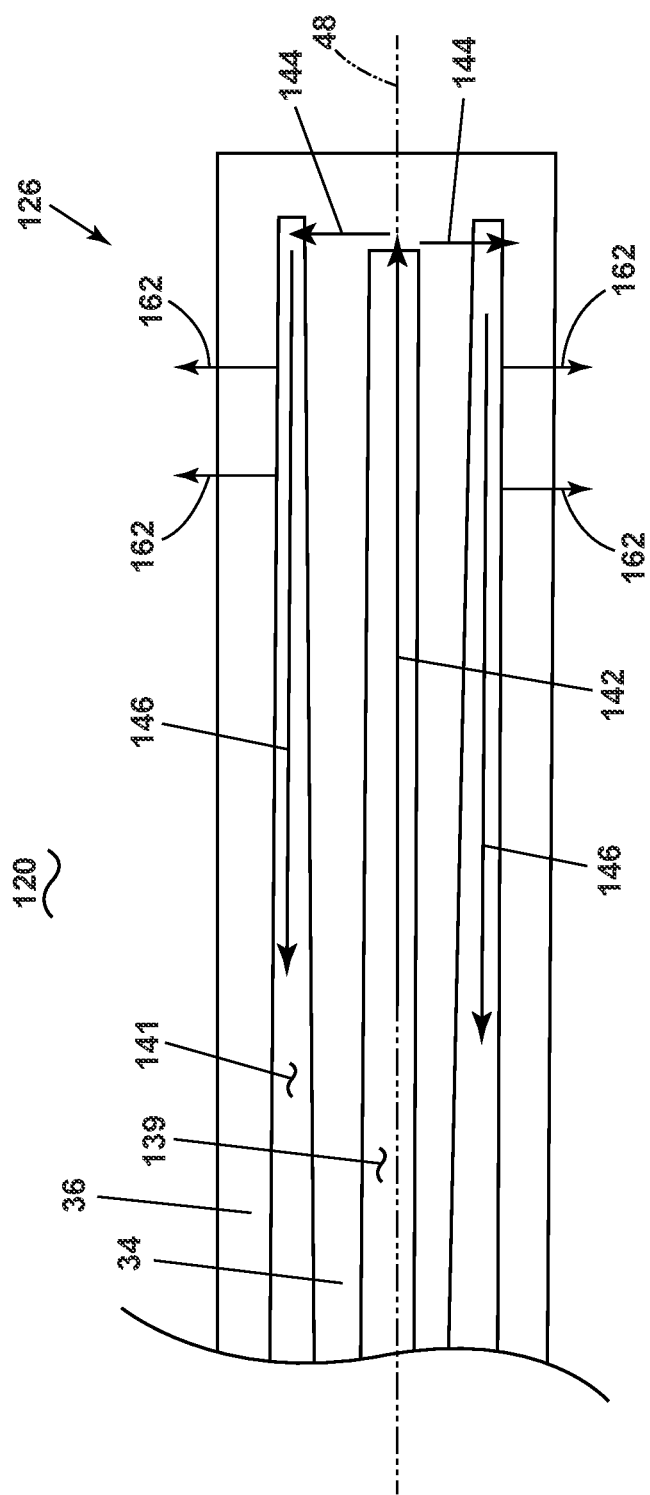
FIG. 7 is a schematic zoomed cross-sectional view of a second end of another rotor of FIG. 3, in accordance with various aspects described herein.

FIG. 7 schematically illustrates another rotor assembly 120 according to another aspect of the present disclosure. The rotor assembly 120 is similar to the rotor assembly 20; therefore, like parts will be identified with like numerals increased by 100, with it being understood that the description of the like parts of the rotor assembly 20 applies to the rotor assembly 120, unless otherwise noted.

One difference schematically illustrated in FIG. 7 can include that the outer cavity 141 can include a changing cross-sectional area along a portion of the axis 48 in a direction moving from the second end 126 toward the first end 24 (not shown). For example, at least one of the outer surface of the inner wall 34, the inner surface of the outer wall 36, or a combination thereof, can include an changing radial distance to the axis 48 along the axis 48 in a direction moving from the second end 126 toward the first end 24. In this example, the cross-sectional area of the outer cavity 141 along the axis 48 can be configured, shaped, angled, or adapted to increase or decrease the coolant flow 142, 144, 146, the coolant flow 142, 144, 146 velocity, or the like, within the outer cavity 141, the inner cavity 139, or the like.

In another non-limiting example aspect of the disclosure, the rotation of the rotor assembly 120, in combination with or independent of a changing cross-sectional area, the angle of the inner surface of the outer wall can be angled, configured, adapted, or designed to operate such that the speed of rotation of the rotor assembly 120 operably affects the coolant flow 146 velocity. For example, where the radial distance of the inner surface of the outer wall 36 increases from the second end to the first end, increasing rotational speed of the rotor assembly 120 can result in or operably affect the movement of coolant along the inner surface of the outer wall 36 by way of the centrifugal forces acting on the coolant, and resultingly or operably increase the velocity coolant flow 146 in the direction moving from the second end to the first end.

Figure 8:
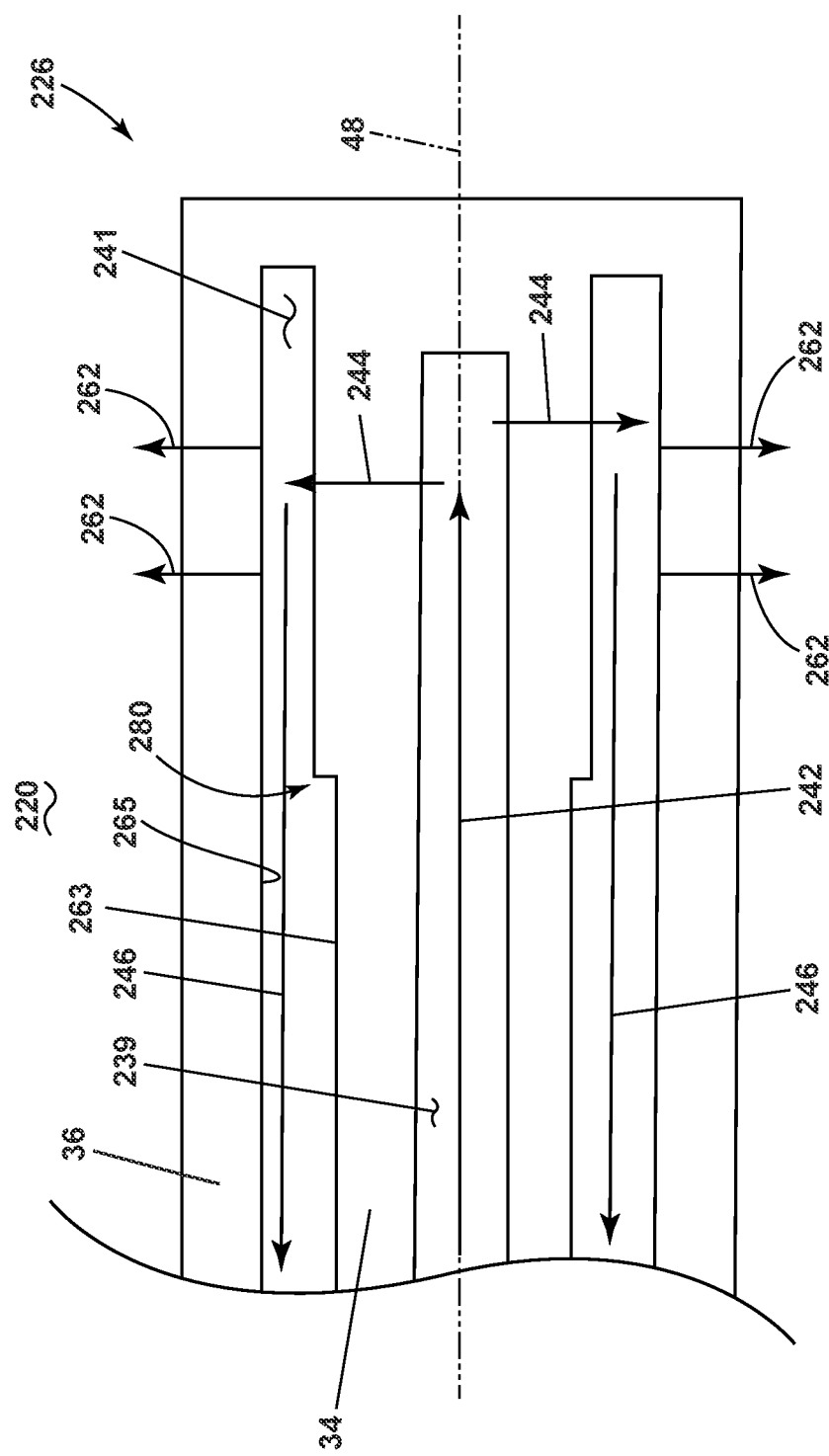
FIG. 8 is a schematic zoomed cross-sectional view of a second end of yet another rotor of FIG. 3, in accordance with various aspects described herein.

FIG. 8 schematically illustrates another rotor assembly 220 according to another aspect of the present disclosure. The rotor assembly 220 is similar to the rotor assemblies 20, 120; therefore, like parts will be identified with like numerals increased to 200, with it being understood that the description of the like parts of the rotor assemblies 20, 120 applies to the rotor assembly 220, unless otherwise noted. One difference schematically illustrated in FIG. 8 can include that the outer cavity 241 can include a changing cross-sectional area along the axis 48 in a direction moving from the second end 226 toward the first end 24 (not shown), by way of edges, steps, or otherwise abrupt radii changes between at least one of the outer surface 263 of the inner wall 34, the inner surface 265 of the outer wall 36, or a combination thereof.

As shown, the abrupt changes can include a step down 280, but can further include any combination of step ups (e.g. reducing a radial difference between respective walls 34, 36), bumps, ledges, tapering, or the like, along a portion of the axis 48 in a direction moving from the second end 226 toward the first end 24. In this example, the cross-sectional area of the outer cavity 241 can be configured, shaped, angled, or adapted to increase or decrease the coolant flow 246, the coolant flow 246 velocity, or the like, within the outer cavity 241.

In another non-limiting example, the radial difference between the respective walls 34, 36 can be configured, shaped, angled, or adapted to increase or decrease the coolant flow 246, the coolant flow 246 velocity, or the like, within the outer cavity 241, for example, to ensure a sufficient coolant pressure, coolant flow velocity, or the like, to the coolant provided to any further components or subcomponents (e.g. by way of coolant flows 62, 162, 262).

In another non-limiting example aspect of the disclosure, the rotation of the rotor assembly 220, in combination with the increasing volume or the increasing radial difference between the respective walls 34, 36, can be configured, adapted, or designed to operate such that the speed of rotation of the rotor assembly 220 can operably affect the coolant flow 246 velocity. For example, increasing rotational speed of the rotor assembly 220 can result in or operably affect the movement of coolant along the inner surface of the outer wall 36 by way of the centrifugal forces acting on the coolant, and resultingly or operably increase or operably decrease the coolant flow 246 velocity.

Figure 9:
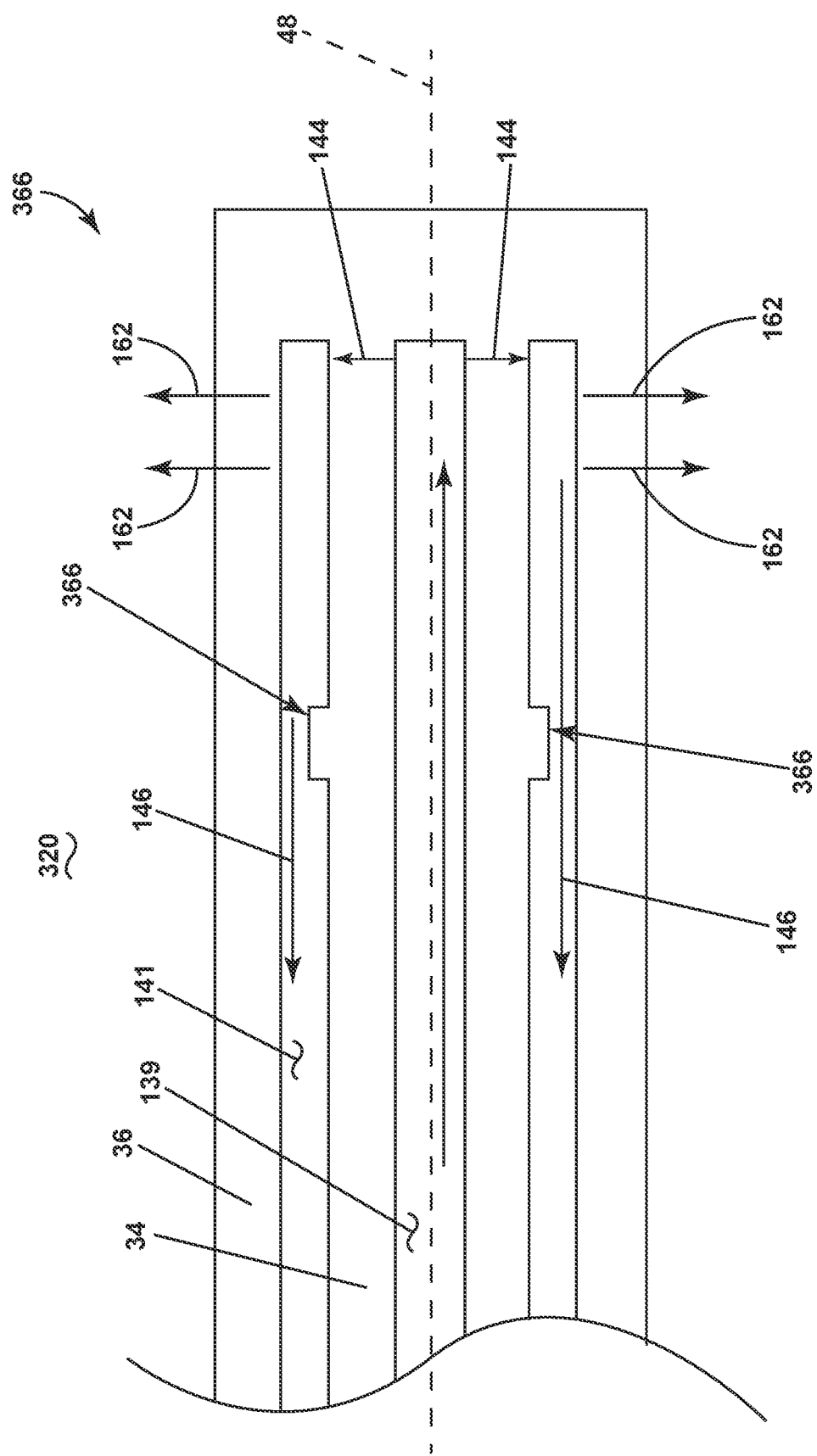
FIG. 9 is a schematic zoomed cross-sectional view of a second end of yet another rotor of FIG. 3, in accordance with various aspects described herein.

FIG. 9 schematically illustrates another rotor assembly 320 according to another aspect of the present disclosure. The rotor assembly 320 is similar to the rotor assemblies 20, 120, 220; therefore, like parts will be identified with like numerals increased to 300, with it being understood that the description of the like parts of the rotor assemblies 20, 120, 220 applies to the rotor assembly 320, unless otherwise noted. One difference schematically illustrated in FIG. 9 can include an annular space restriction, shown as step 366, proximate to the second end 326, limiting, inhibiting, reducing, or otherwise at least partially interrupting coolant flow 146 within the outer cavity 141. As shown, the step 366 can extend axially along only a limited length of the axis 48. In this sense, the step 366 can ensure a limited coolant flow 141 past the step 366, enabling sufficient coolant flow to reach the outlets delivering coolant flow 162.

Figure 10:
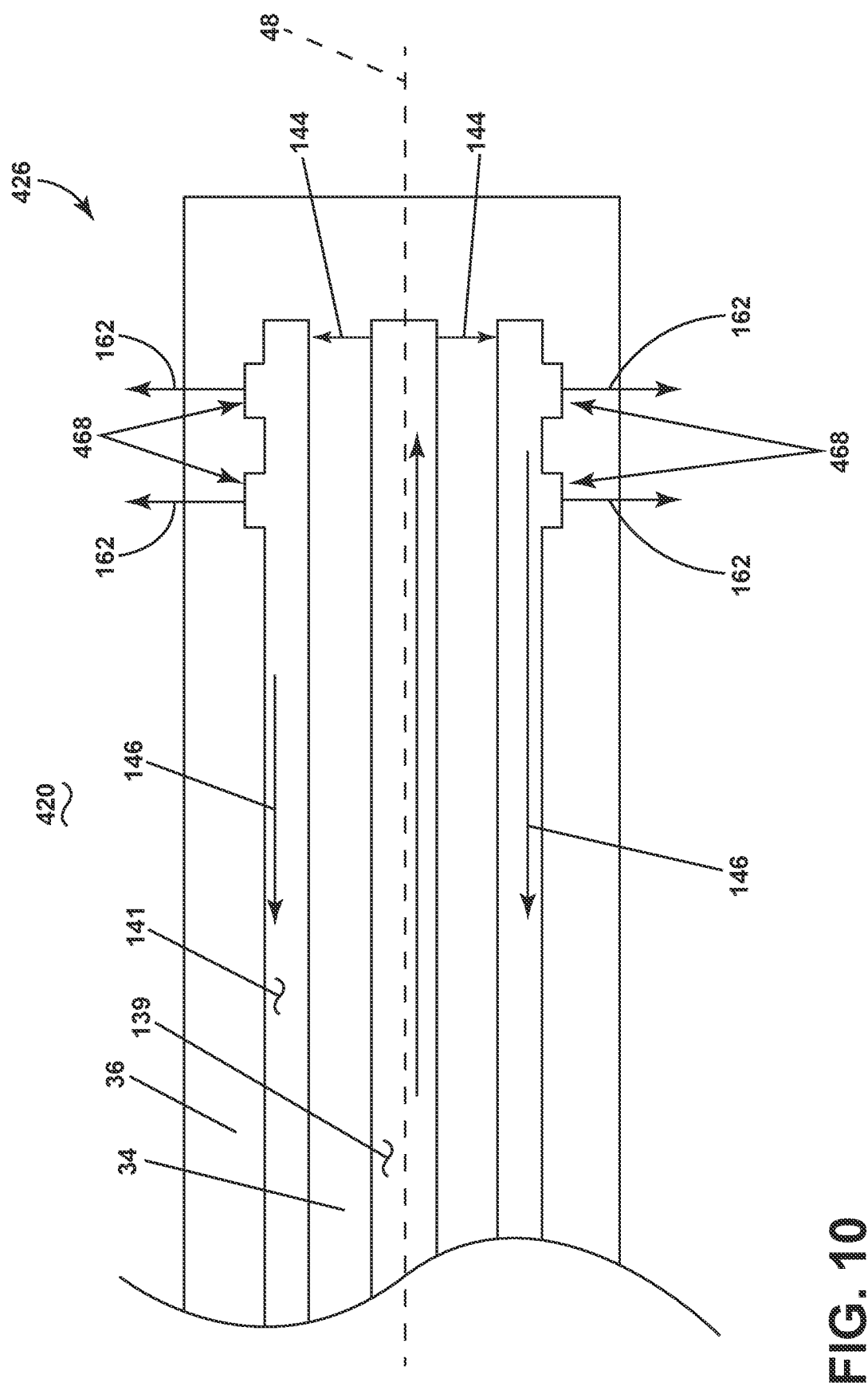
FIG. 10. is a schematic zoomed cross-sectional view of a second end of yet another rotor of FIG. 3, in accordance with various aspects described herein.

FIG. 10 schematically illustrates another rotor assembly 420 according to another aspect of the present disclosure. The rotor assembly 420 is similar to the rotor assemblies 20, 120, 220, 320; therefore, like parts will be identified with like numerals increased to 400, with it being understood that the description of the like parts of the rotor assemblies 20, 120, 220, 320 applies to the rotor assembly 420, unless otherwise noted. One difference schematically illustrated in FIG. 10 can include annular reservoirs 468 axially positioned at the coolant flow 162 to ensure or enable a sufficient amount of coolant flow 162 during operation, proximate to the second end 426.

Aspects of the disclosure provide cooling channels, passages, or the like, configured to allow for or enable the flow of coolant through a rotor assembly 20, 120, 220, 320, 420. The technical effect of aspects of the disclosure provide for cooling of the rotor assembly 20, 120, 220, 320, 420, including variable cooling of a variable frequency electrical machine or generator, which in turn, includes a variable rotational speed rotor assembly. During increasing or relatively higher rotational speed of the rotor, the electrical machine experiences increase thermal demands, higher temperatures, or otherwise higher heat removal demands in the rotor assembly. Aspects of the disclosure provide for a rotor assembly configured to increase coolant flow, coolant flow velocity, or the like, based on (or as a function of) the rotational speed of the rotor assembly 20, 120, 220, 320, 420.

The aforementioned aspects of the disclosure enable or provide an electrical machine or rotor assembly 20, 120, 220, 320, 420 having increased cooling capabilities over contemporary electrical machines. For example, aspects of the disclosure can provide for a dry cavity generator or wet cavity generator. Alternatively, or in addition to the aforementioned benefit, the above-described aspects enable or provide an electrical machine that operate at a higher power density, or generate increased power levels, without a loss in power-generation efficiency due to undesirable heating in the rotor assembly 20, 120, 220, 320, 420.

Yet another advantage of the above described aspects can include increased design, configuration, management, or the like, of coolant flow, including, but not limited to, managing coolant flow pressure drop, coolant leakage flow, coolant flow variation, or a combination thereof, during electrical machine operation. Aspects of the disclosure are included where the rotor inlet includes a diverging inner surface at the cap 50, which in response to rotation of the rotor assembly 20, 120, 220, 320, 420, and centrifugal forces acting on the coolant received by the cap 50, creates a positive coolant flow pressure in the direction of the first end 24 to the second end 26, 126, 226 of the rotor assembly 20, 120, 220, 320, 420. This positive pressure further reduces the likelihood of coolant leakage at the inlet, can produce additional coolant flow velocity in response to rotor speed. Near, at, or proximate to the second end 26, 126, 226, 326, 426, the coolant flow is expelled outward into an annular space between the inner wall 34 and the outer wall 36, wherein the flow reverses direction and flows axially from the second end 26, 126, 226, 326, 426 toward the first end 24. Additional coolant flows can be removed from this annular space to provide additional coolant or cooling desires, such as winding cooling or lubrication of additional components. The remaining coolant exits the rotor assembly 20, 120, 220, 320, 420 from the same side (e.g. the first end 24) where the coolant was initially received. The exit, or portions of the cap 50 as described herein, can further include designs, angling, or the like, for example, to further develop, maintain, or direct pressure or velocity of the coolant flow, as described herein.

Yet another advantage to aspects of the disclosure include a single network cooling architecture for the rotor assembly 20, 120, 220, 320, 420, which uses less coolant compared to conventional systems. Another advantage to aspects of the disclosure include less pressure drop of coolant, for example, as the coolant flow reaches the main rotor cooling passages or nozzles. Non-limiting aspects of the disclosure can further be envisioned wherein the cooling flows can be reversed, e.g. wherein coolant can flow along the outer cavity 41, radially inward toward the axis 48, and along the inner cavity 39.

Many other possible aspects and configurations in addition to that shown in the above figures are contemplated by the present disclosure. Additionally, the design and placement of the various components can be rearranged such that a number of different in-line configurations could be realized. In yet another non-limiting aspect, at least one of the main machine rotor, main machine stator, housing, or rotatable shaft can be manufactured by way of additive manufacturing, or three-dimensional printing. Additive manufacturing can further be utilized for at least one of the cooling passages.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

A rotor assembly, comprising a first end and a second end, the second end distal from the first end, an inner wall extending between the first end and the second end and defining an inner cavity, and an outer wall extending between the first end and the second end, the outer wall radially-overlying the inner wall and defining an outer cavity between the inner wall and the outer wall, wherein the inner wall includes a set of radial openings fluidly coupling the inner cavity with the outer cavity.

The rotor assembly of any preceding clause, wherein the first end further includes a cap having a fluid inlet fluidly coupled with the inner cavity.

The rotor assembly of any preceding clause, wherein the cap further includes an angled inner surface that is angled relative to a rotational axis of the rotor assembly such that a cross-sectional area of the inner cavity increases in a first direction moving from the first end to the second end.

The rotor assembly of any preceding clause, wherein a fluid flow is operably received at the angled inner surface, and wherein the angled inner surface is configured such that operable rotation of the rotor assembly increases the velocity of the fluid flow in the first direction.

The rotor assembly of any preceding clause, wherein the velocity of the fluid flow in the first direction operably increases in response to an increase in rotational speed of the rotor assembly.

The rotor assembly of any preceding clause, wherein the cap further includes an outer surface defining a channel fluidly coupling an exterior of the rotor assembly with the outer cavity.

The rotor assembly of any preceding clause, wherein the rotor assembly defines an operable coolant flow, whereby coolant received within the inner cavity flows from the first end toward the second end, flows radially outward from the inner cavity to the outer cavity by way of the set of radial openings, and flows in the outer cavity from the second end toward the first end.

The rotor assembly of any preceding clause, wherein the set of radial openings further defines a first subset of radial openings each having a first size and a second subset of radial openings having a second size, the second size different from the first size.

The rotor assembly of any preceding clause, wherein the inner wall defines an outer surface and the outer wall defines an inner surface, and wherein at least one of the outer surface of the inner wall and the inner surface of the outer wall defines an angled surface relative to a rotational axis.

The rotor assembly of any preceding clause, wherein a fluid flow is operably received at the angled surface, and wherein the angled surface is configured such that operable rotation of the rotor assembly increases the velocity of the fluid flow in a second direction moving from the second end to the first end.

A variable frequency electrical machine, comprising a coolant source, and a rotor assembly operably rotatable at a variable speed, the rotor assembly comprising a first end and a second end, the second end distal from the first end in an axial direction, and a first radial wall extending between the first end and the second end and defining an angled inner surface that is angled relative to the axial direction, wherein a coolant flow is operably received at the angled inner surface from the coolant source, and wherein the angled inner surface is configured such that operable variable speed rotation of the rotor assembly increases the velocity of the coolant flow in the axial direction.

The variable frequency electrical machine of any preceding clause, wherein at least a portion of the first radial wall of the rotor assembly further includes a cap disposed at the first end, the cap defining the angled inner surface.

The variable frequency electrical machine of any preceding clause, wherein the angled inner surface at least partially defines an inner cavity, and wherein the rotor assembly further includes a second radial wall extending between the first end and the second end, the second radial wall radially-overlying the first radial wall and defining an outer cavity between the first radial wall and the second radial wall.

The variable frequency electrical machine of any preceding clause, wherein at least a portion of the first radial wall of the rotor assembly further includes a rectifier sleeve having a set of radial openings fluidly coupling the inner cavity with the outer cavity.

The variable frequency electrical machine of any preceding clause, wherein the coolant flow operably flows through the inner cavity from the first end toward the second end, wherein the coolant flow operably flows from the inner cavity to the outer cavity through the set of radial openings, and wherein the coolant flow operably flows through the outer cavity from the second end toward the first end.

The variable frequency electrical machine of any preceding clause, wherein the coolant flow is operably received at the first end and operably removed at the first end.

The variable frequency electrical machine of any preceding clause, wherein the angled inner surface includes an increasing radial dimension in the axial direction toward the second end.

The variable frequency electrical machine of any preceding clause, wherein increasing the operable rotational speed of the rotor assembly also increases the velocity of the coolant flow in the axial direction.

The variable frequency electrical machine of any preceding clause, wherein the variable frequency electrical machine is a variable frequency generator.

The variable frequency electrical machine of any preceding clause, wherein the coolant source includes an oil coolant.

The features disclosed in the foregoing description, in the following claims or in the accompanying drawings may, both separately and in any combination thereof, may be material for realizing the invention in diverse forms thereof.

What is claimed is:

1. A rotor assembly, comprising:
a first end and a second end, the second end distal from the first end;
an inner wall extending between the first end and the second end and defining an inner cavity;
an outer wall extending between the first end and the second end, the outer wall radially-overlying the inner wall and defining an outer cavity between the inner wall and the outer wall;
wherein the inner wall includes a set of radial openings fluidly coupling the inner cavity with the outer cavity; and
wherein the set of radial openings further defines a first subset of radial openings each having a first size and a second subset of radial openings having a second size, the second size different from the first size.

2. The rotor assembly of claim 1, wherein the rotor assembly defines an operable coolant flow, whereby coolant received within the inner cavity flows from the first end toward the second end, flows radially outward from the inner cavity to the outer cavity by way of the set of radial openings, and flows in the outer cavity from the second end toward the first end.

3. The rotor assembly of claim 1, wherein the inner wall defines an outer surface and the outer wall defines an inner surface, and wherein at least one of the outer surface of the inner wall and the inner surface of the outer wall defines an angled surface relative to a rotational axis.

4. The rotor assembly of claim 3, wherein a fluid flow is operably received at the angled surface, and wherein the angled surface is configured such that operable rotation of the rotor assembly increases a velocity of the fluid flow in a second direction moving from the second end to the first end.

5. A rotor assembly of claim 1, comprising:
a first end and a second end, the second end distal from the first end;
an inner wall extending between the first end and the second end and defining an inner cavity;
an outer wall extending between the first end and the second end, the outer wall radially-overlying the inner wall and defining an outer cavity between the inner wall and the outer wall;
wherein the inner wall includes a set of radial openings fluidly coupling the inner cavity with the outer cavity;
wherein the first end further includes a cap having a fluid inlet fluidly coupled with the inner cavity;
wherein the cap further includes an angled inner surface that is angled relative to a rotational axis of the rotor assembly such that a cross-sectional area of the inner cavity increases in a first direction moving from the first end to the second end;
wherein a fluid flow is operably received at the angled inner surface; and
wherein the angled inner surface is configured such that operable rotation of the rotor assembly increases a velocity of the fluid flow in the first direction.

6. The rotor assembly of claim 5, wherein the velocity of the fluid flow in the first direction operably increases in response to an increase in rotational speed of the rotor assembly.

7. The rotor assembly of claim 5, wherein the cap further includes an outer surface defining a channel fluidly coupling an exterior of the rotor assembly with the outer cavity.

8. A variable frequency electrical machine, comprising:
a coolant source; and
a rotor assembly operably rotatable at a variable speed, the rotor assembly comprising:
a first end and a second end, the second end distal from the first end in an axial direction; and a first radial wall extending between the first end and the second end and defining an angled inner surface that is angled relative to the axial direction;

wherein a coolant flow is operably received at the angled inner surface from the coolant source, and wherein the angled inner surface is configured such that operable variable speed rotation of the rotor assembly increases a velocity of the coolant flow in the axial direction.

9. The variable frequency electrical machine of claim 8, wherein at least a portion of the first radial wall of the rotor assembly further includes a cap disposed at the first end, the cap defining the angled inner surface.

10. The variable frequency electrical machine of claim 8, wherein the angled inner surface at least partially defines an inner cavity, and wherein the rotor assembly further includes a second radial wall extending between the first end and the second end, the second radial wall radially-overlying the first radial wall and defining an outer cavity between the first radial wall and the second radial wall.

11. The variable frequency electrical machine of claim 10, wherein at least a portion of the first radial wall of the rotor assembly further includes a rectifier sleeve having a set of radial openings fluidly coupling the inner cavity with the outer cavity.

12. The variable frequency electrical machine of claim 11, wherein the coolant flow operably flows through the inner cavity from the first end toward the second end, wherein the coolant flow operably flows from the inner cavity to the outer cavity through the set of radial openings, and wherein the coolant flow operably flows through the outer cavity from the second end toward the first end.

13. The variable frequency electrical machine of claim 12, wherein the coolant flow is operably received at the first end and operably removed at the first end.

14. The variable frequency electrical machine of claim 8, wherein the angled inner surface includes an increasing radial dimension in the axial direction toward the second end.

15. The variable frequency electrical machine of claim 8, wherein increasing the operable rotational speed of the rotor assembly also increases the velocity of the coolant flow in the axial direction.

16. The variable frequency electrical machine of claim 8, wherein the variable frequency electrical machine is a variable frequency generator.

17. The variable frequency electrical machine of claim 8, wherein the coolant source includes an oil coolant.

* * * * *